(12) United States Patent
Wanninger et al.

(10) Patent No.: US 7,632,778 B2
(45) Date of Patent: *Dec. 15, 2009

(54) DEVICE FOR THE GENERATION OF HYDROGEN

(75) Inventors: Klaus Wanninger, Kolbermoor (DE); Peter Britz, Allendorf/Eder (DE); Nicolas Zartenar, Cölbe (DE)

(73) Assignee: Süd-Chemie AG, München (DE)

( * ) Notice: Subject to any disclaimer, the term of this patent is extended or adjusted under 35 U.S.C. 154(b) by 196 days.
This patent is subject to a terminal disclaimer.

(21) Appl. No.: 10/586,320
(22) PCT Filed: Jan. 17, 2005
(86) PCT No.: PCT/EP2005/000401
§ 371 (c)(1), (2), (4) Date: Apr. 9, 2007
(87) PCT Pub. No.: WO2005/068354
PCT Pub. Date: Jul. 28, 2005

(65) Prior Publication Data
US 2007/0172401 A1    Jul. 26, 2007

(30) Foreign Application Priority Data
Jan. 16, 2004    (DE) ..................... 10 2004 002 477

(51) Int. Cl.
| | |
|---|---|
| B01J 21/00 | (2006.01) |
| B01J 21/02 | (2006.01) |
| B01J 21/04 | (2006.01) |
| B01J 21/06 | (2006.01) |
| B01J 8/00 | (2006.01) |
| B01J 23/00 | (2006.01) |
| B01J 23/10 | (2006.01) |
| B01J 23/38 | (2006.01) |
| B01J 23/40 | (2006.01) |
| B01J 23/46 | (2006.01) |
| B01J 23/48 | (2006.01) |
| B01J 23/54 | (2006.01) |
| B01J 23/56 | (2006.01) |
| B01J 23/63 | (2006.01) |
| B01J 23/70 | (2006.01) |
| B01J 23/76 | (2006.01) |

(52) U.S. Cl. ............ 502/325; 502/304; 502/332; 502/344; 502/349; 502/350; 422/141; 422/142; 422/146; 422/149; 422/187; 422/188; 422/189; 422/190; 422/193; 422/198; 422/199; 422/200; 422/202

(58) Field of Classification Search ............... 502/304, 502/325, 332, 344, 349, 350; 422/141, 146, 422/149, 187–190, 193, 198–200, 202, 142
See application file for complete search history.

(56) References Cited

U.S. PATENT DOCUMENTS 5,010,051 A * 4/1991 Rudy ..................... 502/304
(Continued)

FOREIGN PATENT DOCUMENTS

DE    4406007    9/1994
(Continued)

OTHER PUBLICATIONS

Bunluesin, T., et al., Studies of the water-gas-shift reaction on ceria-supported Pt, Pd, and Rh: implications for oxygen-storage properties, Applied Catalysis B: Environmental 15, 1998, pp. 107-114.

*Primary Examiner*—Timothy C Vanoy
*Assistant Examiner*—Serena L Hanor
(74) *Attorney, Agent, or Firm*—Scott R. Cox

(57) ABSTRACT

An apparatus for producing hydrogen, which comprises:
  a. a heated steam reforming (1) with a reforming catalyst to convert gaseous or vaporizable hydrocarbons and water into hydrogen, carbon monoxide and further reformer products;
  b. at least one stage downstream of the steam reforming stage for the catalytic conversion of the mixture of hydrogen, carbon monoxide and excess steam leaving the steam reforming stage (shift stage) (2); and
  c. a fine purification stage (3) downstream of the shift stage(s) for the catalytic lowering of the residual carbon monoxide content of the conversion products by selective methanization,
is described.

In the apparatus, the shift stage (2) and the fine purification stage (3) are configured as a unitary hollow body (exothermic catalyst stage).

19 Claims, 2 Drawing Sheets

U.S. PATENT DOCUMENTS

| | | |
|---|---|---|
| 5,041,270 A | 8/1991 | Fujitani |
| 5,874,051 A | 2/1999 | Heil |
| 6,087,298 A * | 7/2000 | Sung et al. .................. 502/333 |
| 6,524,550 B1 * | 2/2003 | Chintawar et al. .......... 423/650 |
| 6,777,117 B1 | 8/2004 | Igarashi |
| 6,846,475 B1 | 1/2005 | Taguchi |
| 2005/0074377 A1 | 4/2005 | Brakonier |
| 2005/0172553 A1 | 8/2005 | Zartenar |

FOREIGN PATENT DOCUMENTS

| | | |
|---|---|---|
| DE | 10144681 | 3/2003 |
| EP | 1059265 | 12/2000 |
| EP | 1304311 | 4/2003 |
| EP | 1369381 | 12/2003 |
| WO | WO 99/15460 | 4/1999 |
| WO | WO 00/66486 | 11/2000 |

* cited by examiner

DEVICE FOR THE GENERATION OF HYDROGEN

The invention relates to a joint exothermic catalyst stage having at least one shift stage for the catalytic conversion of a mixture of hydrogen, carbon monoxide and excess steam and also a fine purification stage downstream of the shift stage for the catalytic lowering of the residual carbon monoxide content by selective methanization, to a process for producing the joint exothermic catalyst stage and also to an apparatus for producing hydrogen, which comprises a steam reforming stage, at least one conversion stage (shift stage) and a fine purification stage.

Fuel cells offer the opportunity of pollutant-free power generation. If pure hydrogen gas is used as fuel gas and is reacted with atmospheric oxygen in the fuel cell, only water vapor is formed as offgas in energy production. The use of fuel cells should be possible both in the stationary sector and in mobile applications (in motor vehicles). However, the difficulty is to provide gaseous hydrogen in a sufficient amount at the site of the fuel cell. Hydrogen cannot readily be stored without risks. Storage has to be carried out either at very low temperature at which the hydrogen is present in liquid form or under very high pressure in order to provide a sufficient storage density.

Apart from storage as such, one possible way of producing fuel gas for fuel cells is the production of hydrogen gas from hydrocarbons. For this purpose, hydrogen and carbon monoxide are produced from a hydrocarbon and water in a steam reforming stage.

In the steam reforming stage, an endothermic reaction takes place according to the equation $$n\,H_2O + C_nH_{2n+2} \rightleftharpoons 3n+H_2 + n\,CO.$$

The temperature in the steam reforming stage is generally from about 500 to 800° C., preferably about 600° C. The preferred hydrocarbon is methane (n=1); however, it is also possible to use higher, still vaporizable hydrocarbons which are in the gasoline range (n=6 to 8). Instead of the hydrocarbons, it is also possible to use other organic compounds such as methanol. If an excess of steam is present in the reforming stage, part of the carbon monoxide is converted into carbon dioxide. For the purposes of the present invention, the term "further reformer products" refers to carbon dioxide and unreacted hydrocarbons.

However, before the fuel gas can be fed to a fuel cell, for example a polymer membrane (PEM) fuel cell, for generation of power and heat in which the hydrogen produced is then reacted in a known manner to generate power, the carbon monoxide still has to be removed from the fuel gas stream since this damages the polymer membrane.

The reforming stage is therefore generally followed by a plurality of catalyst stages to purify the gas, which, at different temperature levels, lower the concentration of the carbon monoxide which damages the fuel cells. For example, a high-temperature conversion stage, also referred to as high-temperature shift stage or HTS stage, which considerably decreases the carbon monoxide concentration at a temperature level of from about 350 to 400° C., can be provided downstream of the reforming stage. The shift reaction is an exothermic equilibrium reaction. At the temperatures of the high-temperature shift stage, a certain residual concentration of carbon monoxide is therefore still present in the gas mixture leaving the high-temperature shift stage. A further lowering of the carbon monoxide concentration can be achieved subsequently in a low-temperature conversion stage at a temperature of about 200° C. This stage is also referred to as low-temperature shift stage or LTS stage.

In the shift stage, the following exothermic reaction takes place:

$$CO + H_2O \rightleftharpoons CO_2 + H_2$$

To reduce the carbon monoxide content to a level suitable for the fuel cell, it is usual to add another downstream fine purification stage in which the residual carbon monoxide content is decreased by selective oxidation (SelOx stage) or a selective methanization to a value of <100 ppm.

The selective methanization of CO proceeds according to the reaction equation $$CO + 3H_2 \rightleftharpoons CH_4 + H_2O$$

WO 03/080505 describes an apparatus for producing hydrogen. This apparatus comprises:
a. a heated steam reforming stage with a reforming catalyst to convert gaseous or vaporizable hydrocarbons and water into hydrogen, carbon monoxide and further reformer products;
b. at least one stage downstream of the steam reforming stage for the catalytic conversion of the mixture of hydrogen, carbon monoxide and excess steam leaving the steam reforming stage (shift stage); and
c. a fine purification stage downstream of the conversion stage(s) for the catalytic lowering of the residual carbon monoxide content of the conversion products.

The conversion stage(s) and the fine purification stage are each configured as hollow bodies having an annular space to accommodate the appropriate catalysts.

The production of the individual conversion stages is in each case carried out individually by applying and, if appropriate, calcining the appropriate catalyst on the walls of the hollow bodies in order to set an optimal activity of the catalyst in each case. The individual hollow bodies are subsequently joined to one another to give, for example, a joint exothermic catalyst stage in which both conversion and fine purification can be carried out. The joining is achieved, for example, by welding the individual hollow bodies to one another.

A large number of small flow channels run in the longitudinal direction through the hollow bodies used for producing the individual conversion stages. The production of the hollow bodies is therefore very expensive. To produce a joint exothermic catalyst stage having at least one shift stage for the catalytic conversion of a mixture of hydrogen, carbon monoxide and excess steam and also a fine purification stage downstream of the shift stage for the catalytic lowering of the residual carbon monoxide content by selective methanization, it is necessary firstly to provide two hollow bodies which have to be individually provided with the appropriate suitable catalyst. It may be necessary for the catalysts to be calcined again in order to activate the catalyst after application of a further component such as a noble metal compound. The finished hollow bodies then have to be joined, for example by welding the hollow bodies to one another. The use of a plurality of hollow bodies and the many working steps make the production of such a joint catalyst stage very complicated and thus also very expensive.

DE 195 44 895 C1 describes a process for the selective catalytic oxidation of carbon monoxide present in a hydrogen-containing mixed gas stream. The mixed gas stream is passed through a CO oxidation reactor containing the catalyst material. Oxidizing gas can be additionally fed into the CO oxidation reactor at a plurality of points. The CO oxidation reactor also has a cooling apparatus through which a coolant is passed. To regulate the reactor temperature, the coolant stream is adjusted appropriately. The temperature of the mixed gas stream on entering the CO oxidation reactor is reduced by means of static mixer structures and the oxidizing gas is in each case introduced into the mixed gas stream at a flow rate which is predetermined as a function of the operating parameters.

DE 101 44 681 A1 describes a flow reactor which has at least one catalyst unit which is coated with a catalyst and through which a feed stream can be passed. Furthermore, the reactor has a feed unit through which a reactant stream can be passed and which has an adjusting element which can be moved relative to the catalyst unit and via which a flow-through area of the reactant stream into the catalyst unit can be influenced.

EP 1 304 311 A2 describes an apparatus for producing hydrogen for the operation of fuel cells. The apparatus comprises a reformer for converting hydrocarbon gas and water into hydrogen and further reformer products. The reformer is provided with a heat source configured as a burner by means of which a defined quantity of process heat can be provided. For the chemical work-up of the reformer products, reaction-specific, exothermic catalyst stages are installed downstream of the reformer. The heat source is overdimensioned in respect of the actual quantity of process heat required for reforming. Furthermore, means of removing a quantity of heat which may be additionally produced if necessary are provided on the apparatus, with the removal not impairing the reforming process. The heat source provided with a first offgas flue is connected to a second offgas flue which is designed to be closeable if necessary and is provided with at least one heat exchanger for the defined removal of the quantity of heat additionally liberated if necessary.

EP 1 019 317 B1 describes an apparatus for purifying a hydrogen-rich gas stream containing carbon monoxide. The apparatus comprises a reaction zone in which carbon monoxide is removed selectively from the gas stream in a catalyzed reaction. Furthermore, a device by means of which a controlled amount of liquid water can be introduced into the gas stream is provided upstream of the reaction zone. Furthermore, a device for mixing the liquid water with the gas stream and for vaporizing the liquid water is provided upstream of the reaction zone. The temperature of the gas stream can be reduced by vaporization of the water to such an extent that a preferred removal of carbon monoxide from the gas stream takes place in the reaction zone.

DE 101 42 794 A1 describes a catalytic coating for a gas generation unit which comprises a reforming reactor for gas generation, a reformate cooler and a downstream shift stage for purifying the reformate gas. The surfaces of the reformate cooler over which the reformate gas flows have a coating which comprises at least one catalytic component. The coating protects against corrosion or against deposition of soot in oxidizing, reducing and carbon-containing gases. As a result of the direct utilization of the coated component as catalytically active reactor unit, a water gas shift reaction preceding the actual shift stage occurs to a partial extent to reduce the CO content in the reformate cooler. This leads to the subsequent shift stages being smaller.

An important motivation for the further development of the fuel cell is the challenge to be able to meet the exhaust gas regulations for motor vehicles which are expected to become stricter in the future. However, for the fuel cell to be introduced to a wide extent as energy source, it is necessary to make the production of fuel cells and also the apparatuses for producing the fuel gases, essentially hydrogen, considerably cheaper.

It was therefore an object of the invention to provide a joint exothermic catalyst stage having at least one shift stage for the catalytic conversion of a mixture of hydrogen, carbon monoxide and excess steam and also a fine purification stage downstream of the shift stage for the catalytic lowering of the residual carbon monoxide content by selective methanization, which can be produced simply and thus inexpensively.

This object is achieved by a joint exothermic catalyst stage having the features of claim 1. Advantageous embodiments are subject matter of the dependent claims.

According to the invention, in the joint exothermic catalyst stage having at least one shift stage for the catalytic conversion of a mixture of hydrogen, carbon monoxide and excess steam and a fine purification stage downstream of the shift stage for the catalytic lowering of the residual carbon monoxide content of conversion products produced in the shift stage by selective methanization, it is provided for the shift stage and the fine purification stage to be configured as a unitary hollow body.

For the purposes of the present invention, a unitary hollow body is a continuous hollow body which has not been obtained by joining of at least two shorter hollow bodies but has been originally produced in its final length. It has surprisingly been found that two different catalysts can be arranged in a joint hollow body so that both catalysts, viz. both the shift catalyst and the methanization catalyst, achieve their optimal activity. It has hitherto been believed that each of the catalysts has to be applied to an individual hollow body in order to be able to control the production of the hollow bodies so that the catalyst can display its optimal properties. The application of the shift catalyst generally requires conditions which are not compatible with the conditions employed in the application of the methanization catalyst, and vice versa. Thus, for example, the fixing of the one catalyst on the hollow body can require calcination at a temperature at which the other catalyst is deactivated again. Furthermore, the application of the one catalyst can influence the properties of the other catalyst if the application comprises, for example, impregnation steps and the impregnation occurs at least partly on the other catalyst, since the impregnation solution also goes over into the coating of the other catalyst as a result of capillary forces. It has now surprisingly been found that clever production of the joint exothermic catalyst stage enables both catalysts, viz. the shift catalyst and also the methanization catalyst, to be obtained with optimal activity. As a result, it is possible to use a single long hollow body in place of two short hollow bodies. The production of a long hollow body is simpler and thus significantly cheaper to carry out than the production of two short hollow bodies which subsequently have to be joined.

As shift catalysts, it is possible to use, for example, Pt on $TiO_2$ and/or $ZrO_2$ and/or $CeO_2$ (generally tetravalent metals) and/or CuO/Zno.

In the shift stage, preference is given to providing at least one shift catalyst which comprises at least one transition metal on a first support comprising a metal oxide selected from the group consisting of the metals of groups IB and VIIIB of the Periodic Table of the Elements and also rhenium and cadmium. These shift catalysts have a sufficiently high thermal stability for them to retain their original activity even after any calcination necessary for fixing and activating the methanization catalyst.

The transition metal can preferably be selected from among iron, cobalt, nickel, copper, ruthenium, rhodium, palladium, silver, osmium, iridium, platinum, gold, rhenium, cadmium and combinations of these metals and can be present in concentrations of up to about 20% by weight, based on the weight of the shift catalyst.

The metal oxide present in the first support is preferably selected from among cerium oxide and zirconium oxide, with the metal oxides being able to be present in the support either individually or in admixture.

In a preferred embodiment, the shift catalyst can contain at least one transition metal promoter.

The promoter can be selected from among lithium, potassium, rubidium, cesium, titanium, vanadium, niobium, molybdenum, tungsten, manganese, rhenium, iron, cobalt, nickel, copper, ruthenium, rhodium, palladium, silver, osmium, iridium, platinum, gold and combinations of these metals and can be present in concentrations of up to about 20% by weight, based on the weight of the shift catalyst.

The transition metal can be applied to the first support by impregnating the support with a solution of the transition metal in order to form a support impregnated with the transition metal. This impregnated support can subsequently or simultaneously be impregnated with the promoter to form the catalyst.

The shift catalyst can further comprise additives from the group consisting of gadolinium, samarium, zirconium, lithium, cesium, lanthanum, manganese, titanium and combinations of these additives, which can be present in concentrations of up to about 90% by weight, based on the weight of the shift catalyst.

The first support can contain up to about 80% by weight of zirconium oxide, based on the weight of the first support, in addition to cerium oxide. The first support is then formed by a cerium zirconium oxide having about 3 cerium atoms per zirconium atom.

Such shift catalysts are described, for example, in the U.S. patent application Ser. No. 10/108,814.

The first support can have a surface area of from about 50 to 150 $m^2/g$.

The shift catalyst can be produced, for example, by applying the first support to the appropriate part of the hollow body and, after any fixing has been carried out, is impregnated with a solution of a compound of the transition metal. After the solvent has been removed, the impregnated material is calcined.

As catalysts in the fine purification stage, it is possible to use the known methanization catalysts, e.g. ruthenium on various metal oxide supports (e.g. $Al_2O_3$, $TiO_2$, $CeO_2$ and/or zeolites).

In the fine purification stage, preference is given to at least one methanization catalyst which comprises at least one metal which is able to form a metal carbonyl species on a second support being provided.

The metal is preferably selected from the group consisting of ruthenium, rhodium, platinum, palladium, rhenium, nickel, iron, cobalt, lead, tin, silver, iridium, gold, copper, manganese, zinc, zirconium, molybdenum.

The support is preferably selected from among a crystalline aluminosilicate (e.g. a molecular sieve, β-zeolite, mordenite, faujasite), aluminum oxide, cerium oxide, titanium oxide and combinations thereof.

The methanization catalysts can further comprise inert binders such as γ-$Al_2O_3$, $SiO_2$ and/or pseudoboehmite.

Such methanization catalysts are described, for example, in the U.S. Patent Application 60/516,230.

The hollow body preferably has a wall space for accommodating the shift catalyst or the methanization catalyst.

The hollow body is preferably configured as a hollow cylinder. The wall space is then configured as an annular space running around the circumference. However, it is also possible to use hollow bodies having, for example, triangular or rectangular hollow cross sections. As a result of the joint exothermic catalyst stage preferably being configured as a hollow cylinder having a wall space, an essentially isothermal, radial temperature profile is established over the flow cross section of the joint exothermic catalyst stage, since at the same flow cross-sectional area, compared to that of a solid cylindrical catalyst body, the distance between the marginal regions is significantly smaller.

The temperature distribution in the configuration of the joint exothermic catalyst stage as a hollow cylinder is more favorable in the radial direction, i.e. the temperature gradient is significantly smaller than in the case of conventional solid cylinders. For operation of a fuel cell, the carbon monoxide concentration in the fuel gas must be very low. For this reason, only narrow temperature windows can be permitted in the joint exothermic catalyst stage since otherwise the proportion of carbon monoxide would increase too much. The configuration as a hollow cylinder is therefore particularly suitable for the joint exothermic catalyst stage according to the invention.

The wall space preferably has a cross-sectional thickness which is from about 2 to 20% of the external diameter of the hollow body.

In a preferred embodiment of the joint exothermic catalyst stage, flow channels are provided in the wall space.

The flow channels are preferably arranged in a honeycomb structure. Here, it is possible to use, for example, ceramic honeycombs. The catalysts are preferably located on a (corrugated) metal foil bounding the flow channels.

To make the radial temperature profile of the joint exothermic catalyst stage even more uniform and to improve the mass transfer within the hollow cylinder, perforations are preferably provided between the individual flow channels. This results in the gas mixtures being able to flow not only axially in the joint exothermic catalyst stage but, to even out the temperature, also to a certain extent transversely through the catalyst stages. The perforations increase the turbulence so that the gas mixtures in the interior of the wall space, i.e. the section of the wall space which is relatively close to the longitudinal axis of the joint exothermic catalyst stage, are well mixed with the gas mixtures in the outer region of the wall space, which have a somewhat different composition.

The main flow direction of the hydrogen and of the reformer products within the hollow body or wall space is preferably oriented essentially parallel to the longitudinal axis of the joint exothermic catalyst stage. The flow channels are therefore arranged essentially parallel to the longitudinal axis of the joint exothermic catalyst stage or the hollow body.

In a particularly preferred embodiment of the joint exothermic catalyst stage, the hollow body has at least one central flow channel. The central flow channel is preferably formed within the wall space, so that heat exchange between the central flow channel and the wall space is possible. It is possible, for example, for the hydrocarbons to be conveyed through the central flow channel to the steam reforming stage while the gaseous products leaving the steam reforming stage flow through the wall space and removal of the carbon monoxide is effected by means of the shift stage and the fine purification stage. Here, heat exchange with the hydrocarbon flowing into the steam reforming stage takes place, as a result of which heat evolved in the shift stage and the fine purification stage is removed uniformly so that the temperature gradient in the wall space is also reduced in the axial direction.

In a further preferred embodiment, the joint exothermic catalyst stage comprises a flow feed housing which surrounds it on the outside and through which a cooling medium flows in order to cool the catalyst stage. As cooling medium, it is possible to use, for example, water which is in this way created so that it can subsequently be fed, if appropriate after further heating, in vapor form to the steam reforming stage. However, it is also possible to use, for example, hydrocarbons as cooling medium, and after passage through the flow feed housing these are fed to the steam reforming stage.

The heat evolved in the joint exothermic catalyst stage is removed by means of the cooling medium, which brings the additional advantage that the heat generated in the catalyst stage can be removed in a targeted manner and not be uselessly given off to the environment. The cooling of the outer wall gives the further advantage of a considerable evening out of the axial temperature profile.

The flow feed housing preferably has inlet and outlet connections for the cooling medium, by means of which the cooling medium can, for example, be fed to the steam reforming stage. The flow feed housing is, if desired, designed for cocurrent or countercurrent flow relative to the flow direction of the reformer products within the catalyst stage.

Furthermore, regulating devices for adjusting the mass flow of the cooling medium can be provided on the inlet and/or outlet connections of the flow feed housing.

The invention further provides a process for producing a joint exothermic catalyst stage as described above. The process comprises the steps:

(a) provision of a hollow body;
(b) dipping of the hollow body into a suspension of a first support comprising a metal oxide over a first part of the length of the hollow body;
(c) fixing of the first support on the first part of the length of the hollow body so that a first coating is obtained;
(d) application of a metal to the first coating, with the metal being selected from the group consisting of the metals of groups IB and VIIIB of the Periodic Table of the Elements, rhenium and cadmium;
(e) application of a second support which comprises at least one metal which is able to form a metal carbonyl species to at least part of the length of the hollow body which is not covered by the first coating.

In the process of the invention preference is given to using, as described above in connection with the joint exothermic catalyst stage, a tubular hollow body which has a central flow channel running along the longitudinal axis in its interior. The central flow channel is surrounded by a wall space through which flow channels run essentially parallel to the longitudinal axis of the hollow body. The hollow body preferably comprises a suitable metal, i.e. it is configured as a metal honeycomb.

The application of the catalyst components of the shift stage and of the fine purification stage to the hollow body or to the walls of the flow channels running in the wall space is generally carried out as follows:

The hollow body is firstly, from its one end, dipped over a first part of its length into a suspension of a first support comprising a metal oxide. The length over which the hollow body is dipped into the suspension of the first support depends on the activity of the catalyst and on the reaction conditions of the shift reaction and can be estimated by a person skilled in the art on the basis of the appropriate data.

After the hollow body has been taken out of the suspension, excess suspension of the first support can be removed by, for example, blowing it out. Care is taken here to ensure that no suspension gets into the part of the hollow body which is still uncovered and in which the other catalyst is to be applied in a later working step.

The first suspension can then, if appropriate, be dried in order to fix the first support on the surface of the hollow body or of the flow channel. If a relatively large amount of the first support is to be applied, the dipping procedure can be repeated an appropriate number of times.

To fix the first support on the walls of the hollow body, in particular the flow channels, a calcination is preferably carried out. The calcination temperature depends on the support material used. The calcination temperature is chosen, for example, in the range from 200 to 800° C., preferably from 400 to 700° C., particularly preferably from 500 to 600° C.

This gives a first coating which covers the hollow body over a first length. A catalytically active metal is then applied on top of the first coating, with the metal being selected from the group consisting of the metals of groups IB and VIIIB of the Periodic Table of the Elements and also rhenium and cadmium. For this purpose, a solution of a suitable metal salt, for example an aqueous solution of the appropriate nitrate, is prepared and the first coating is impregnated with the solution. The solvent is subsequently evaporated. To fix the metals, a calcination can, if appropriate, subsequently be carried out in order to convert the metal salts into the form of their oxides or into the metal. If appropriate, the impregnation with the metal salt and its fixing can be repeated in order to apply a larger amount of the metal salt. The shift catalyst, for example, has then been applied and fixed on the first part of the hollow body.

The hollow body is then turned around and dipped into a suspension of a second support which comprises at least the one metal which is able to form a metal carbonyl species. The hollow body is dipped into the suspension of the second support to such a distance that a second coating is applied to at least part of the length of the hollow body which is not covered with the first coating.

The solvent, for example, water, is subsequently evaporated in order to fix the second coating obtained from the second support on the hollow body. A calcination is preferably carried out again to achieve the fixing and activation. The calcination is preferably carried out at a temperature at which the other catalyst, for example the shift catalyst, is not deactivated. Suitable temperatures can be chosen, for example, in the range from 200 to 800° C., preferably from 400 to 700° C., particularly preferably from 400 to 550° C. In general, the calcination temperature for the calcination of the second coating is lower than the calcination temperature for the first coating.

The second coating can be produced by firstly applying the second support to the hollow body and, if appropriate after a calcination step, fixing it. In a further step, the metal can then be applied by means of an impregnation step. However, preference is given to firstly applying the metal or a suitable precursor, for example a nitrate salt or the metal oxide, to the second support and fixing it on the latter, for example by means of a calcination step. The second support is subsequently applied to the hollow body and, if appropriate, fixed by means of a calcination. This prevents the impregnation solution from soaking into the first coating as a result of capillary forces and deactivating the (shift) catalyst there.

Specifically, the uncovered end of the hollow body is dipped into the suspension of the second support and, after taking it out, excess suspension is blown off from the end of the first coating, so that the first coating is not contaminated or covered by the second suspension. After drying, a final calcination is then carried out.

The joint exothermic catalyst stage of the invention is, in combination with a steam reforming stage, very suitable for production of a fuel gas for use in a fuel cell. The invention therefore further provides an apparatus for producing hydrogen, which comprises:

(a) a heated steam reforming stage with a reforming catalyst to convert gaseous or vaporizable hydrocarbons and water into hydrogen, carbon monoxide and further reformer products;

(b) at least one stage downstream of the steam reforming stage for the catalytic conversion of the mixture of hydrogen, carbon monoxide and excess steam leaving the steam reforming stage (shift state); and (c) a fine purification stage downstream of the at least one shift stage for the catalytic lowering of the residual carbon monoxide content of the conversion products by selective methanization, wherein the shift stage and the fine purification stage is configured as a joint exothermic catalyst stage as has been described above.

The joint exothermic catalyst stage is configured as a single hollow body, preferably as an annular honeycomb, preferably with a flow feed housing which surrounds it on the outside and through which a cooling medium flows in order to cool the catalyst stages. Furthermore, internal cooling can be used.

In the steam reforming stage, a mixture of hydrogen gas and carbon monoxide is firstly produced from a hydrocarbon and water vapor. This reaction proceeds endothermically.

The heated steam reforming stage is therefore preferably configured as a hollow body and comprises a burner which is arranged centrally in the hollow cylinder of the steam reforming stage.

From the steam reforming stage, the gas goes over into the shift stage. The shift stage can be divided into a high-temperature shift stage (temperature range from 230 to 300° C.) and a separate low-temperature shift stage (180 to 220° C.). The joint exothermic catalyst stage can in this case be made up of the low-temperature shift stage and the fine purification stage. In this case, a heat exchanger can be provided between the high-temperature shift stage and the low-temperature shift stage to enable the reaction products coming from the high-temperature shift stage to be cooled to a suitable temperature before they enter the low-temperature shift stage.

However, preference is given to using only a single shift stage which is preferably operated in the range from 190 to 300° C. The CO content after the shift stage is from about 0.4 to 1.0% by volume.

Preference is given to an indirect heat exchanger being provided between the exothermic catalyst stage and the steam reforming stage and the water required for steam reforming being passed through this in countercurrent to the gaseous products coming from the exothermic catalyst stage.

After the shift stage, the gas goes into the fine purification stage in which the carbon monoxide concentration is reduced to below 100 ppm. The temperature in the fine purification stage (c) is from about 200 to 250° C. The methane formed in the selective methanization does not interfere when the gas is used in a fuel cell. The $CH_4$ content, including the methane which has not been reacted in the reforming stage, is from about 1 to 4% by volume.

The invention is illustrated below with the aid of an example and with reference to the accompanying figures. Identical items are provided with identical reference numerals. In the figures.

Figure 1:
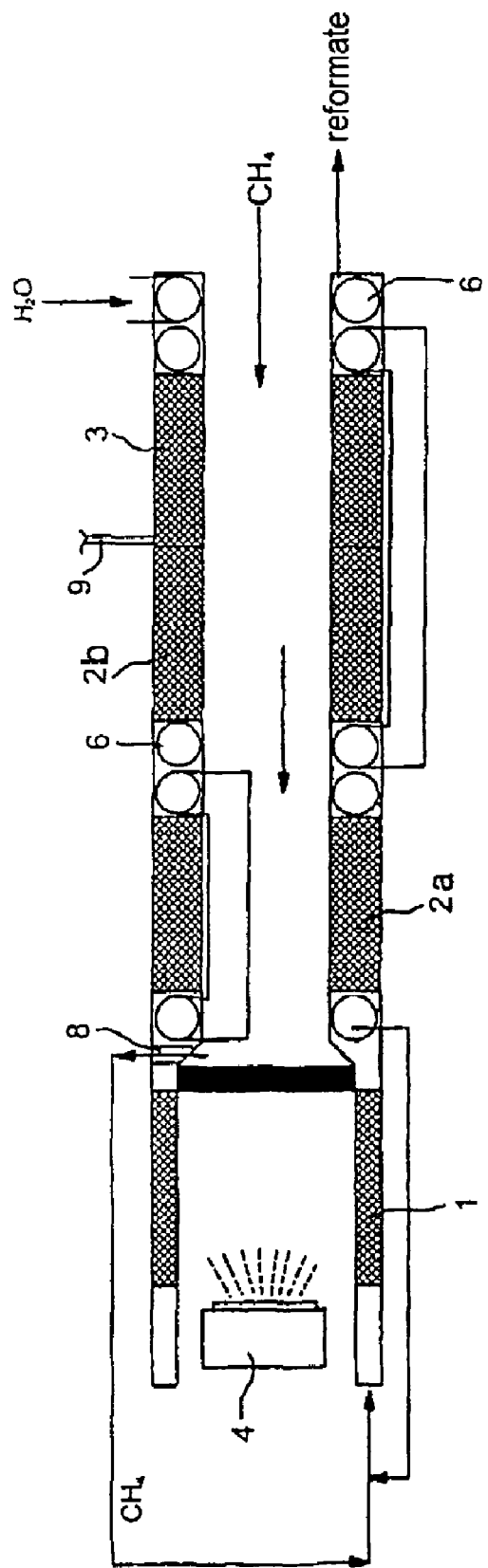
FIG. 1 shows a longitudinal section through an apparatus as described in WO 03/080505.

FIG. 1 schematically shows an apparatus for producing hydrogen as is described, for example, in WO 03/080505, in the form of a longitudinal section. In the steam reforming stage 1, gaseous or vaporizable hydrocarbons, in particular methane, are reacted with water vapor to form hydrogen, carbon monoxide and further reformer products. The steam reforming stage 1 is configured in the form of a hollow cylinder in whose center a burner 4 is located. For the chemical work-up, i.e. for the lowering of the carbon monoxide content of the reformer products, the steam reforming stage 1 is followed by three catalyst stages, with catalyst stage 2a being a high-temperature shift stage (HTS stage), stage 2b being a low-temperature shift stage (LTS stage) and stage 3 being a gas purification stage (methanization stage). In the hollow space between the hollow-cylindrical catalyst stages 2a, 2b, 3, a flow channel 5 through which the gaseous or vaporizable hydrocarbons are conveyed in the direction of the arrow opposite to the flow direction of the reformer products to effect preheating is provided. The heat generated in the exothermic reaction in the catalyst stages 2a, 2b and 3 is used directly to heat the starting materials for steam reforming. The flow channel 5 can also be configured as an annular channel in order to heat the hydrocarbons passed through it more uniformly.

A dividing wall 7 is provided to separate the hollow-cylindrical reformer space of the steam reforming stage 1 from the flow channel 5, i.e. the hydrocarbon gas enters the steam reforming stage 1 via the schematically depicted connection 8.

To preheat the water necessary for the reforming reaction, heat exchangers 6 (for example helical tube heat exchangers) are provided between the stages 2a and 2b and at the end of stage 3. Process water is passed through these and they are connected thermally to the flow channel 5. A further heat exchanger can be provided between the stages 2b and 3.

The low-temperature shift stage 2b and the fine purification stage 3 have each been produced as separate units and can subsequently be combined by means of a weld 9 to form a joint cylindrical exothermic catalyst stage. To achieve this, it is necessary to produce two shorter cylindrical hollow bodies whose lengths correspond to the LTS stage 2b or the fine purification stage 3. The hollow bodies are then firstly each coated with a catalyst for the low-temperature shift reaction or with a methanization catalyst. The two finished hollow bodies are then joined to one another by welding in a further step.

Figure 2:
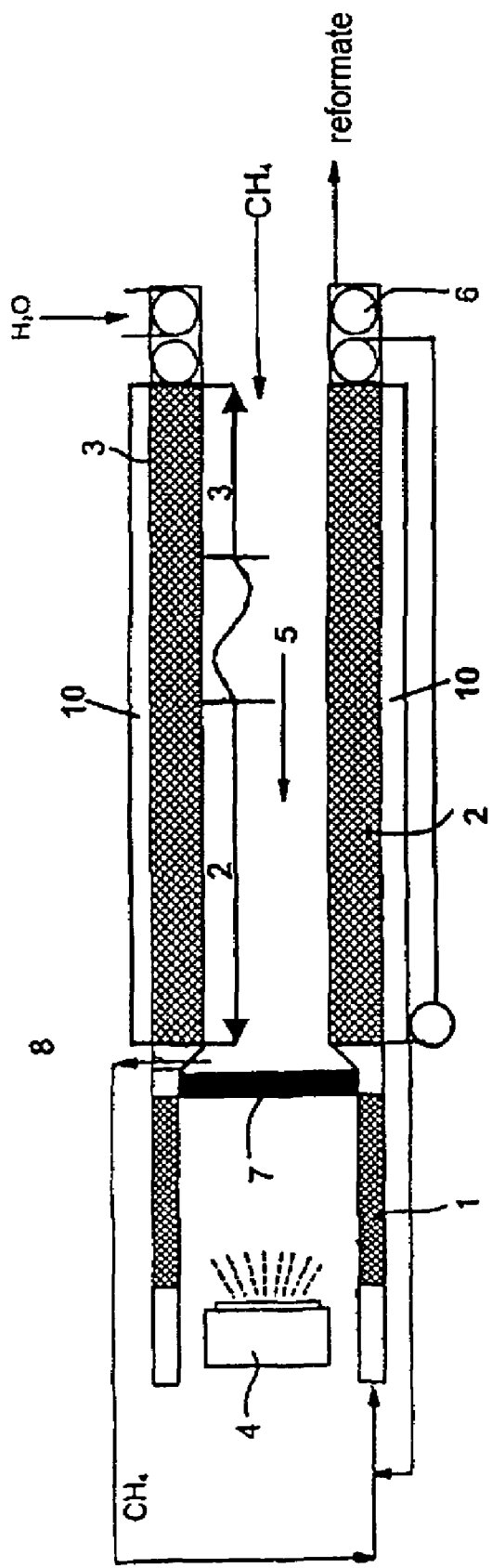
FIG. 2 shows a longitudinal section through an apparatus which comprises a joint exothermic catalyst stage.

FIG. 2 shows an apparatus according to the invention which comprises a joint exothermic catalyst stage (2, 3) comprising a unitary hollow body.

The apparatus according to the invention comprises a steam reforming stage 1. This is, like the apparatus depicted in FIG. 1, configured as a cylindrical hollow body in whose center a burner 4 is located in order to provide the energy necessary for the endothermic steam reforming. A suitable reforming catalyst over which the starting materials for the reaction, viz. water vapor and hydrocarbons, are passed is provided in the wall space of the steam reforming stage 1.

For the chemical work-up, i.e. for the lowering of the carbon monoxide content of the reformer products, the steam reforming stage 1 is followed by a joint exothermic catalyst stage, with section 2 forming a shift stage and section 3 forming a gas purification stage utilizing selective methanization.

The joint exothermic catalyst stage 2, 3 has a wall space which is located along its circumference and through which flow channels (not shown) run. The flow channels are connected by perforations (not shown) so that gas exchange between the individual flow channels can take place. The reformer products from the steam reforming stage 1 enter the wall space of the joint exothermic catalyst stage (2, 3) and travel through these, with the carbon monoxide being converted into carbon dioxide in the shift stage 2 and into methane in the fine purification stage 3. The gas leaving the fine purification stage has a residual carbon monoxide content of <100 ppm and a methane content of from about 1 to 4% by volume.

A flow channel 5 is provided in the center of the hollow-cylindrical joint exothermic catalyst stage 2, 3. The gaseous or vaporizable hydrocarbons are conveyed through the flow channel 5 in the direction of the arrow opposite to the flow direction of the reformer products flowing in the outer wall space in order to effect preheating, i.e. the heat evolved in the exothermic reactions in the joint catalyst stage 2, 3 is used directly to heat the reformer starting materials. The flow channel 5 can also be configured as an annular channel (not shown).

A dividing wall 7 is provided to separate the hollow-cylindrical reformer space of the steam reforming stage 1 from the flow channel 5, i.e. the hydrocarbon gas conveyed through the central flow channel 5 enters the steam reforming stage 1 via the schematically depicted connection 8.

Finally, to heat the water required for the reforming reaction, heat exchangers 6 (for example helical tube heat exchangers) can be provided between the steam reforming stage 1 and the joint exothermic catalyst stage 2, 3 (not shown) and at the connection to the fine purification stage 3. Process water is passed through these and they are connected thermally to the flow channel 5. If a heat exchanger (not shown) is provided between the steam reforming stage 1 and the shift stage 2, the reformer gases leaving the steam reforming stage 1 can be cooled to a temperature suitable for the shift reaction.

The joint exothermic catalyst stage 2, 3 is surrounded on the outside by a flow feed housing 10 for a cooling medium for cooling the joint exothermic catalyst stage. As cooling medium, it is possible to pass, for example, water or a hydrocarbon through the flow feed housing 10.

The heat evolved in the joint exothermic catalyst stage (2, 3) is removed by means of the cooling medium, which brings the additional advantage that the heat generated in the catalyst stage can be removed in a targeted manner and is not uselessly given off to the environment. As a result of the outer wall cooling, the axial temperature profile is made considerably more uniform.

The cooling medium is introduced into or removed from the flow feed housing 10 for the cooling medium via inlet and outlet connections (not shown). The cooling medium can be conveyed through the flow feed housing 10 either in cocurrent or countercurrent to the flow direction in the wall space of the joint exothermic catalyst stage. If water or a hydrocarbon is used as cooling medium, this can then be fed to the steam reforming stage 1.

Regulating devices (not shown) for adjusting the mass flow of the cooling medium are provided at the inlet and/or outlet connections of the flow feed housing 10.

According to the invention, the joint exothermic catalyst stage 2, 3 comprises a unitary hollow body. This is configured as an annular honeycomb which in the embodiment shown in FIG. 2 comprises metal. The annular honeycomb is coated from each end to the middle with suspensions of two different catalysts (washcoat). The hollow body itself is thus made up of a unitary piece and not, as in the case of the apparatus known from the prior art in FIG. 1, of two individually produced shorter hollow bodies which have been joined together.

Figure 3:
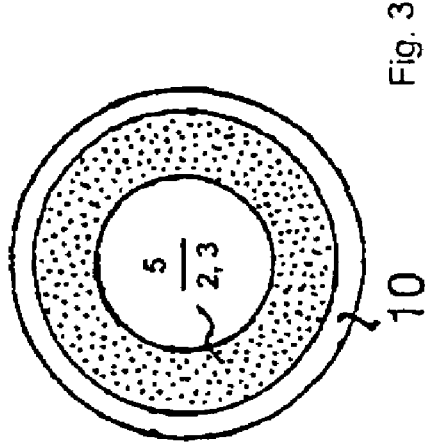
FIG. 3 shows a cross section through the joint exothermic catalyst stage depicted in FIG. 2.

FIG. 3 shows a cross section through the joint exothermic catalyst stage 2, 3 according to the invention. A flow channel 5 through which, as mentioned above, hydrocarbons, for example, are passed in order to be preheated for steam reforming runs along the center of the hollow body. Around the central flow channel 5 there is a wall space through which flow channels (not shown) run. Either the shift catalyst (2) or the methanization catalyst (3) of the fine purification stage is present in the wall space. The wall space is in turn surrounded by a flow feed housing 10 through which, for example, water as cooling medium is passed in order to be preheated for steam reforming. The shift reaction taking place in the wall space (shift stage 2) or methanization (fine purification stage 3) in each case proceeds exothermally. The energy liberated goes from the wall space at least partly into the central flow channel 5 and the flow feed housing 10 where it can be utilized for preheating the starting materials for steam reforming.

The production of the joint exothermic catalyst stage 2, 3 will be discussed in detail below.

Some problems occur in the coating of the joint exothermic catalyst stage as depicted in the apparatus in FIG. 2 by the customary procedure. The shift catalyst and the methanization catalyst normally have different operating and calcination temperatures.

In addition, there are two methods of producing coated catalysts. The first method involves firstly coating the support and applying the active component (e.g. noble metal) by impregnation. The advantage of this method is that all the noble metal is accessible. The disadvantage is that the active component can migrate during drying of the noble metal solution after impregnation. This brings particular problems, in particular in the case of two catalysts in one honeycomb. The second method involves firstly producing a finished catalyst including the active component (e.g. noble metal) in powder form and then producing a suspension as washcoat therefrom and coating the honeycomb support with this. However, the noble metal component is partly covered by the support and is thus no longer available for the reaction. These difficulties are circumvented in the production of the inventive joint exothermic catalyst stage in the following way:

In general, the catalysts and reaction conditions for the first coating (shift stage) and the second coating (fine purification; selective methanization) are chosen so that the exit temperature from the shift reaction which takes place first corresponds essentially to the entry temperature to the selective methanization. Owing to the high activity required, mainly ruthenium catalysts come into question for the methanization. In the case of these, the methanization of $CO_2$ proceeds too strongly at above 250° C., as a result of which selective methanization becomes difficult. The shift catalyst should thus still operate at 250° C. and withstand the higher calcination temperature of the ruthenium catalyst. Many platinum catalysts for the shift reaction on various supports such as $TiO_2$, $ZrO_2$, $CeO_2$ and mixed oxides are known from the literature (Appl. Catal. B Environmental, 15, (1998), 107-114 or WO 00/66486 or WO 00/54879 or EP 1 046 612 A1).

It has been found that a Pt/Re catalyst on $TiO_2$ or a mixed oxide of $ZrO_2$ and $CeO_2$ meets these activity requirements (WO 00/54879). This catalyst is very active up to 240° C. and achieves CO values below 0.7%. In addition, this catalyst can be calcined at relatively high temperatures (above 500° C.), in contrast to Cu/Zn catalysts which then lose a considerable part of their activity.

Appropriate choice of the catalysts and the coating method thus enables a shift stage and a selective methanization stage to be produced on a single metal honeycomb.

Specifically, a suspension of the support material ($TiO_2$ or $Zr/CeO_2$ mixed oxide) in water is firstly prepared. The metal honeycomb is partly dipped into this suspension and then blown out from the end which was not dipped. As a result, the coating covers only part of the channels. A calcination is subsequently carried out. The honeycomb is then dipped to the same height into a platinum/rhenium solution and the coating is impregnated therewith. After drying, calcination is again carried out. The honeycomb has then been coated with a shift catalyst to a particular height. The ratio of the space velocities of the two catalyst stages determines the height ratio during dipping. At identical space velocities for the shift reaction and the selective methanization, the honeycomb is coated with the shift catalyst precisely to the middle.

A powder catalyst for selective methanization is then produced. Ruthenium on oxidic supports such as $TiO_2$, $Al_2O_3$, $ZrO_2$, zeolites or mixtures of these oxides is suitable for this purpose. For example, reference may be made to the relevant disclosure of the U.S. patent application 60/516,230 (cf. above). An aqueous suspension is then once again prepared from this ruthenium-containing oxide powder and the other end of the honeycomb is dipped into the suspension so that the previously uncoated part of the honeycomb is wetted. The honeycomb is again blown out so that no ruthenium catalyst is blown into the part of the honeycomb which has previously been coated with the shift catalyst. The honeycomb is then blown out from the end which has previously been coated with the shift catalyst. Calcination is subsequently carried out.

This gives a metal honeycomb comprising the two exothermic reaction stages for purifying hydrogen to less than 100 ppm of CO. The cost advantage is obvious; only one metal honeycomb has to be produced for two catalytic stages.

The following example illustrates the production of the unitary exothermic catalyst stage.

EXAMPLE

The unitary exothermic catalyst stage which comprises a shift stage and a stage for selective methanization is configured as an annular honeycomb. The metal honeycomb, which has a length of about 180 mm, an external diameter of about 180 mm and an internal diameter of about 135 mm, is used for producing the unitary exothermic catalyst stage. The honeycomb is dipped to halfway up into the suspension of a mixed oxide of $CeO_2$ and $ZrO_2$ (weight ratio: 75/25) having a solids content of 50% by weight, which has previously been milled in a bead mill. The excess suspension is removed from the end which has not been dipped by blowing out the honeycomb. This ensures that the coating covers only half the length of the honeycomb channels. The honeycomb is subsequently dried and calcined at 550° C. The procedure is repeated until an amount of coating of 200 g per liter of honeycomb volume has been reached. A solution of tetrammineplatinum hydroxide and ammonium perrhenate which contains 8% by weight of platinum and has a Pt/Re molar ratio of 3 is then prepared. The honeycomb is then dipped to the same height into the platinum/rhenium solution and the coating is impregnated therewith. After drying, the honeycomb is once again calcined at 550° C. The honeycomb has then been coated to the middle with a shift catalyst.

A powder catalyst for selective methanization is subsequently produced. For this purpose, a suspension of ammonium mordenite-20 in a solution of ruthenium nitrosyl nitrate is prepared. The ruthenium concentration of the suspension is calculated so that 2% by weight of ruthenium based on the dry weight of the ammonium mordenite-20 are present. This suspension is dried and subsequently calcined at 475° C. An aqueous suspension is once again prepared from this ruthenium-containing oxide powder and is milled in a bead mill. The opposite end of the honeycomb is then dipped into the suspension so that the previously uncoated half is wetted. It is again blown out so that no ruthenium catalyst is blown into the part of the honeycomb which has previously been coated with shift catalyst. For this reason, it is blown out from the end which is coated with the shift catalyst. It is then calcined at 475° C.

This gives a metal honeycomb which contains the two exothermic reaction stages for purification of hydrogen to less than 100 ppm of CO.

The annular honeycomb obtained in this way can be provided with an outer or interior wall so that a cooling medium can be passed through the intermediate space between the outer or interior wall and the annular honeycomb.

The invention claimed is:

1. A joint exothermic catalyst stage (2, 3) comprising at least one shift stage (2) for catalytic conversion of a mixture of hydrogen, carbon monoxide and excess steam and a fine purification stage (3) downstream of the shift stage (2) for catalytic lowering of the residual carbon monoxide content of conversion products produced in the shift stage by selective methanization, wherein the shift stage (2) and the fine purification stage are configured as a unitary hollow body, wherein a methanization catalyst for the fine purification stage comprises ruthenium.

2. The exothermic catalyst stage as claimed in claim 1, wherein a shift catalyst for the shift stage comprises at least one metal on a first support comprising a metal oxide, wherein said at least one metal is selected from the group consisting of the metals of groups IB and VIIIB of the Periodic Table of the Elements and rhenium and mixtures thereof.

3. The exothermic catalyst stage as claimed in claim 2, wherein the metal oxide comprises cerium oxide or zirconium oxide or a combination thereof.

4. The exothermic catalyst stage as claimed in claim 2, wherein the shift catalyst further comprises at least one transition metal promoter.

5. The exothermic catalyst stage as claimed in claim 4, wherein the second support is selected from the group consisting of a crystalline aluminosilicate, aluminum oxide, cerium oxide, titanium oxide and combinations thereof.

6. The exothermic catalyst stage as claimed in claim 4, wherein the hollow body has a wall space for accommodating the shift catalyst and the methanization catalyst.

7. The exothermic catalyst stage as claimed in claim 6, wherein the wall space has a cross-sectional thickness which is from about 2 to 20% of an external diameter of the hollow body.

8. The exothermic catalyst stage as claimed in claim 6, wherein flow channels are provided in the wall space.

9. The exothermic catalyst stage as claimed in claim 8, wherein perforations are provided between the flow channels.

10. The exothermic catalyst stage as claimed in claim 8, wherein the flow channels are arranged essentially parallel to a longitudinal axis of the hollow body.

11. The exothermic catalyst stage as claimed in claim 1, wherein the hollow body has at least one central flow channel (5).

12. The exothermic catalyst stage as claimed in claim 1 further comprising a flow feed housing (10) on the outside of the hollow body, through which a cooling medium flows.

13. A process for producing a joint exothermic catalyst stage which comprises the steps:
    (a) providing a hollow body;
    (b) dipping of the hollow body into a suspension of a first support comprising a metal oxide over a first part of a length of the hollow body;
    (c) fixing of the first support on the first part of the length of the hollow body so that a first coating is produced;
    (d) application of a metal to the first coating, with the metal being selected from the group consisting of the metals of groups IB and VIIIB of the Periodic Table of the Elements and rhenium, and mixtures thereof; and
    (e) application of a methanization catalyst comprising ruthenium on a second support to at least a part of the length of the hollow body which is not covered by the first coating.

14. The process as claimed in claim 13, wherein the first coating is calcined after application of the metal.

15. The process as claimed in claim 13, wherein calcination is carried out after application of the second support.

16. An apparatus for producing hydrogen, which comprises:
    (a) a heated steam reforming stage (1) comprising a reforming catalyst to convert gaseous or vaporizable hydrocarbons and water into hydrogen, carbon monoxide and further reformer products;
    (b) at least one shift stage (2) downstream of the steam reforming stage for the catalytic conversion of the mixture of hydrogen, carbon monoxide and excess team leaving the steam reforming stage; and
    (c) a fine purification stage (3) downstream of the at least one shift stage (2) for the catalytic lowering of the residual carbon monoxide content of the conversion products by selective methanization, wherein a methanization catalyst for the fine purification stage comprises at least ruthenium, and
    wherein the shift stage (2) and the fine purification stage (3) are configured as a unitary hollow body.

17. The apparatus as claimed in claim 16, wherein the heated steam reforming stage (1) is configured as a hollow body and comprises a burner (4) which is arranged centrally in the hollow body of the reforming stage.

18. The apparatus as claimed in claim 16, wherein at least one indirect heat exchanger (6) is provided between the unitary hollow body and the steam reforming stage (1) and water required for steam reforming is passed through it in countercurrent to the gaseous products coming from the exothermic catalyst stage (2, 3).

19. The apparatus as claimed in claim 16, wherein the apparatus comprises only a single shift stage (2).

* * * * *